N. W. RACE.
VALVE.
APPLICATION FILED JUNE 17, 1912.
1,064,376.
Patented June 10, 1913.
2 SHEETS—SHEET 1.
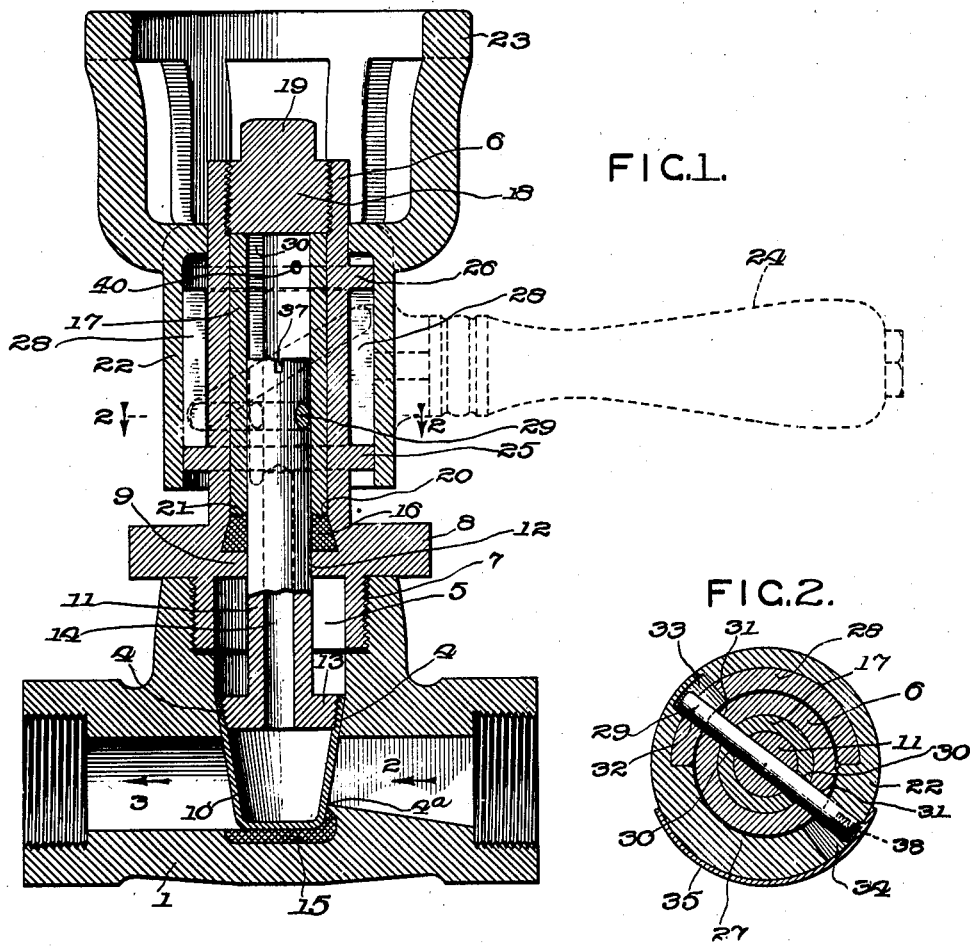
FIG. 1.
FIG. 2.
FIG. 3.
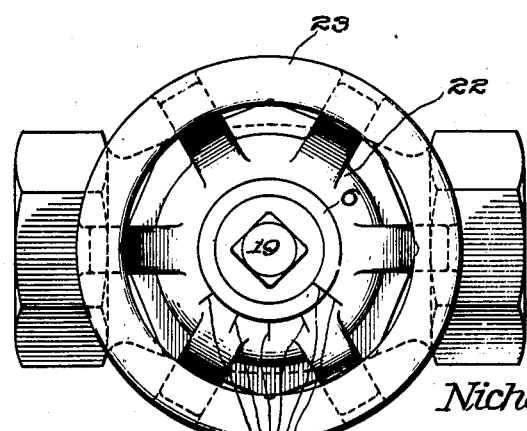
Witnesses:
Inventor:
Nicholas W. Race.
By Luther L. Miller
Atty.

N. W. RACE.
VALVE.
APPLICATION FILED JUNE 17, 1912.

1,064,376.

Patented June 10, 1913.
2 SHEETS—SHEET 2.

Witnesses:
J. C. Devick.
Earl E. Carlson.

Inventor:
Nicholas W. Race.
By Luther L. Miller
Atty.

UNITED STATES PATENT OFFICE.

NICHOLAS W. RACE, OF CHICAGO, ILLINOIS.

VALVE.

1,064,376.

Specification of Letters Patent.   Patented June 10, 1913.

Application filed June 17, 1912.   Serial No. 704,061.

*To all whom it may concern:*

Be it known that I, NICHOLAS W. RACE, a citizen of the United States, residing at Chicago, in the county of Cook and State of Illinois, have invented certain new and useful Improvements in Valves, of which the following is a specification.

This invention relates to valves for controlling the flow of steam, water, and other fluids.

One of the objects of this invention is to provide a construction in which no obstruction is presented to the flow of the fluid when the valve is open.

Another object of the invention is to provide a construction in which there is no chamber or recess in which sediment may collect.

Another object is to construct the valve so that it may be repacked while in service.

Another object is to provide an improved seat for the valve.

A further object is to improve the construction of the valve member with a view to facilitating manufacture and replacement.

A further object is to improve the construction of the valve casing so as to facilitate the insertion and removal of the valve member.

A further object is to provide improved means for operating the valve member.

Figure 4:
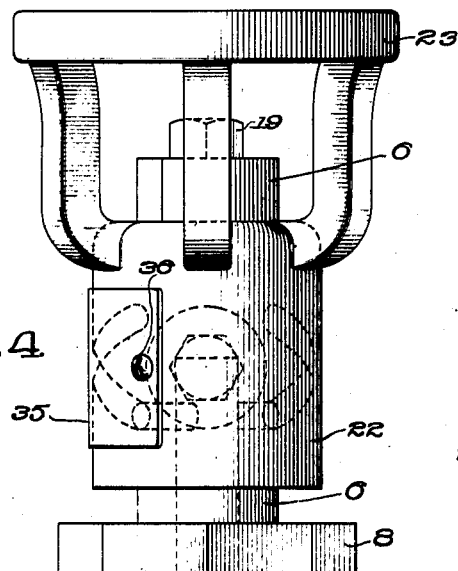
Figure 5:
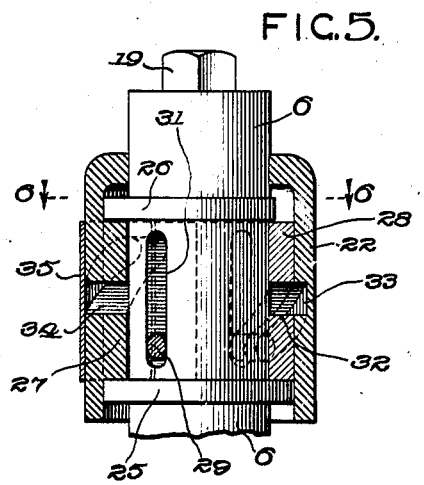
Figure 6:
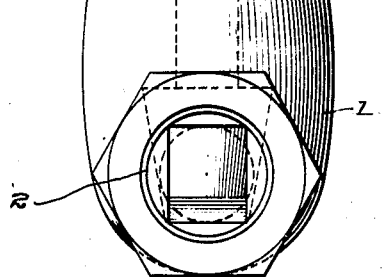
Figure 6:
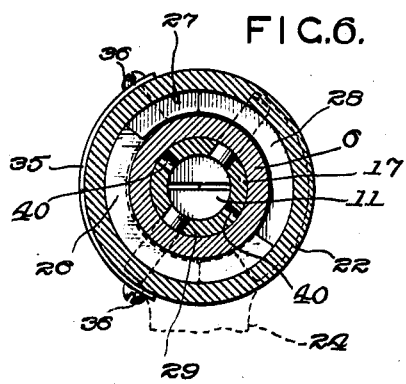
Figure 7:
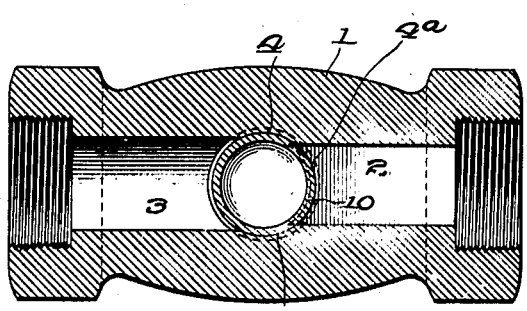

In the accompanying drawings, Figure 1 is a central section through a valve embodying the features of my invention. Fig. 2 is a transverse sectional view taken in plane of dotted line 2 2 of Fig. 1. Fig. 3 is a top plan view of the valve. Fig. 4 is an elevation of the valve taken from the right-hand side of Fig. 1. Fig. 5 is a fragmental sectional view of the operating mechanism. Fig. 6 is a section on line 6 6 of Fig. 5. Fig. 7 is a horizontal sectional view through the valve casing and the valve member in closed position.

In the embodiment which has been selected to illustrate the invention, the valve casing 1 comprises passages 2 and 3, either of which may be the inlet passage, a valve seat, and a chamber 5 into which the valve member is moved in the operation of opening the valve. The valve seat comprises two portions 4 arranged to be in contact with opposite portions of the tapering surface of a frusto-conical valve member hereinafter described; a portion 4$^a$ extending between the seat portions 4 and across the direction of flow of the fluid and arranged to be in contact with a part of the tapering surface of the valve member; and a seat hereinafter described for the smaller end wall of the valve member. A cylindrical tubular portion 6 is secured to the valve casing 1 by means of a screw-thread connection 7, said cylindrical portion being provided with a wrench-receiving flange 8. Within the portion 6 is an annular flange 9 forming a bearing for a valve stem to be presently described.

A frusto-conical valve member 10, tapered to conform to the valve seat portions 4, 4$^a$, is provided at its larger end with a stem 11 which is longitudinally slidable in the bearing 12 in the cylindrical portion 6. The valve member and its stem are held against turning movement by means to be later described. Said valve member may be constructed in any suitable manner, but preferably it is formed of drawn sheet metal and has a screw-thread connection with a flange 13 on the lower or inner end of the valve stem 11. This construction permits of making the valve member of different material from that of the valve stem, if desired, and facilitates renewal or replacement of the valve member when necessary. Said construction also economizes in material. To further economize material, the valve stem may, if desired, be provided with a longitudinal axial bore 14.

In order that particles of scale or sediment shall not interfere with proper seating of the valve member, I may provide, as herein shown, for the smaller end of said valve member a seat 15 which consists of lead or other relatively soft material.

Leakage along the valve stem 11 may be prevented by suitable means, such, for example, as packing material 16 of any preferred character placed within the cylindrical portion 6 above the flange 9, said packing being suitably pressed against the valve stem and the interior walls of the cylindrical portion 6, as by means of a sleeve 17 fitting within said cylindrical portion and pressed against the packing by means of a screw plug 18 having a wrench-receiving portion 19. The inner end of the sleeve 17 preferably has beveled surfaces 20 and 21, whereby the pressure of said sleeve forces the packing both against the valve stem and the interior walls of the cylindrical portion.

The valve member is reciprocated by means including a cam sleeve 22 rotatably mounted upon the cylindrical portion 6 and provided with a hand-wheel 23 or a handle 24. Said sleeve is releasably held against endwise displacement by any suitable means. Herein I have shown a circular flange 25 and a semicircular or arcuate flange 26 formed upon the periphery of the cylindrical portion 6. Upon the inner side of the cam sleeve 22 is a semicircular enlargement 27, the length of which is substantially equal to the distance between the flanges 25 and 26. The sleeve 22 may be positioned on the cylindrical portion 6 by placing said sleeve at the outer end of the portion 6 with the enlargement 27 diametrically opposite the semicircular flange 26; said sleeve may then be moved longitudinally of the portion 6 until the enlargement 27 is in contact with the circular flange 25, whereupon the sleeve may be turned into its operative position wherein a portion of the enlargement 27 is below the semicircular flange 26. The semicircular flange then serves to prevent the sleeve from being removed. A semicylindrical filler-piece 28, equal in length to the enlargement 27, fills the space between the sleeve 22 and the portion 6 opposite the enlargement. This piece is placed against the tubular portion 6 directly beneath the semicircular flange 26 before the sleeve 22 is slipped over said tubular portion.

The connection between the valve stem 11 and the operating sleeve 22 is effected by a pin 29 extending through said stem, through slots 30, 31 and 32 in the sleeve 17, tubular portion 6 and filler piece 28, respectively, into a cam groove 33 and a cam slot 34 in the operating sleeve 22. The slots 30 and 31 are straight and serve to prevent rotation of the valve stem and valve member. The slot 32 in the filler-piece 28 is curved to register with the groove 33. The object in providing the filler-piece 28 is to obtain a substantially equal bearing for both ends of the pin 29. The outer side of the slot 34 may be closed or covered in any suitable way, as, for example, by means of a plate 35 removably secured in place by screws 36.

The angle of inclination of the cam slots 32 and 34 and the cam groove 33 may be of any desired degree; herein I have shown said slots and groove as having such inclination that the valve member may be fully unseated in approximately a quarter-turn of the handle or hand-wheel, thus, enabling rapid opening and closing of the valve.

To facilitate the operation of passing the pin 29 through the stem 11, the outer end of said stem may be provided with a screwdriver slot 37 so that the stem may be turned to bring the opening therein into register with the slots 30 and 31.

When it is desired to disassemble the valve and remove the valve member, the plate 35 is removed, the pin 29 withdrawn, and the tubular portion 6 unscrewed from the body 1. To facilitate the operation of withdrawing the pin 29, the latter may, if desired, be provided in one end with a screw-threaded opening 38 to receive a suitable tool.

Indicating marks 39 (Fig. 3) may, if desired, be placed on adjacent portions of the sleeve 22 and portion 6 to indicate the open, closed and partially open positions of the valve-member.

40 are openings formed in the sleeve 17 to receive an instrument to be used when necessary in withdrawing the sleeve.

In use, the valve member 10 may be seated and unseated by turning the handle 24 or hand-wheel 23. Such turning movement causes the walls of the cam groove 33 and the cam slots 32 and 34 to bear against and move the pin 29 along the straight slots 30 and 31. The movement of the valve member being reciprocatory and non-rotative, there is no rubbing or friction of the valve member upon its seat, and consequently said valve member does not wear or injure its seat. When the valve member is wholly unseated, the fluid has a straight course through the valve casing.

When the frusto-conical valve member is seated, the pressure of the fluid is exerted against the sides of the valve member, and the degree of taper of said member is such that the fluid pressure tends to hold the valve member seated rather than to lift the valve member; hence the sleeve 17 and the packing 16 may be withdrawn and new packing substituted while the valve is in service and the valve member seated.

If desired, the valve may be locked against unauthorized or accidental operation of the hand wheel or handle, by tightening up the screw plug 18 until the pressure of the packing 16 on the valve stem 11 is sufficient to render movement of said valve stem difficult.

Should one side of the valve member 10 become pitted, it may be reversed by withdrawing the pin 29, turning the valve stem through a half-revolution, and reinserting the pin.

It will be evident that the fluid pressure may be at either side of the valve member 10, and that the valve may be arranged in horizontal, upright or inverted position, as may be convenient or desirable. When in upright position, as usual, there is no chamber or recess in which sediment may collect.

The embodiment herein disclosed is susceptible of modification, hence the invention is not limited to the details set forth.

I claim as my invention:

1. In a valve, in combination, a valve casing provided with a valve seat and fluid passages, a valve member for said seat, a valve stem attached to said valve member, a pin extending through said valve stem and projecting from each side thereof, said valve casing having two straight slots through which the opposite end portions of said pin extend, an operating cam sleeve rotatably mounted on the valve casing and provided with cam slots into which the end portions of said pin extend, and means for preventing longitudinal displacement of said cam sleeve.

2. In a valve, in combination, a valve casing provided with a valve seat and fluid passages; a valve member for said seat; a valve stem attached to said valve member; a pin extending through said valve stem and projecting from each side thereof, said valve casing having two straight slots through which the opposite end portions of said pin extend; an operating cam sleeve rotatably mounted on the valve casing and provided with cam slots into which the end portions of said pin extend; two flanges on the valve casing, one of the said flanges being arcuate; and a portion on said cam sleeve adapted to lie between said flanges to prevent longitudinal displacement of said cam sleeve.

3. In a valve, in combination, a valve casing having fluid passages, a valve seat and a tubular portion; a valve member adapted to said seat; a stem attached to said valve member and extending into said tubular portion; a pin attached to said stem, said tubular portion having a slot therein through which said pin extends for preventing rotation of said valve stem; a circular flange and an arcuate flange upon the periphery of said tubular portion and spaced apart; and a cam sleeve rotatably mounted on said flanges and having an interior curved portion of a length substantially equal to the distance between said flanges, said curved portion being of such dimensions as to pass the arcuate flange when the cam sleeve is moved longitudinally of said tubular portion, said interior curved portion being adapted to lie between said flanges to prevent longitudinal displacement of the cam sleeve, said sleeve having cam means adapted to engage said pin to move the latter in the rotation of the cam sleeve.

4. In a valve, a valve casing having two fluid passages and a valve seat between said passages; a frusto-conical valve member having a smaller end wall, said seat comprising two portions arranged to be in contact with opposite portions of the tapering surface of said valve member, a portion arranged to be in contact with the smaller end wall of said valve member, and a portion extending between the first mentioned two portions and the second mentioned portion and across the direction of flow of the fluid and arranged to be in contact with a portion of the tapering surface of the valve member, the portion of the seat against which the smaller end wall of the valve member bears being in the same plane as the bottom of one of said passages, whereby sediment is prevented from collecting on said seat; and means for moving said valve member.

In testimony whereof I affix my signature in presence of two witnesses.

NICHOLAS W. RACE.

Witnesses:
EARL C. CARLSON,
GEORGE L. CHINDAHL.